(12) United States Patent
Honda et al.

(10) Patent No.: US 6,598,693 B2
(45) Date of Patent: Jul. 29, 2003

(54) ELECTRIC MOTOR-DRIVEN VEHICLE

(75) Inventors: Satoshi Honda, Saitama (JP); Tomokazu Sakamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/972,877

(22) Filed: Oct. 10, 2001

(65) Prior Publication Data

US 2002/0046891 A1 Apr. 25, 2002

(30) Foreign Application Priority Data

Oct. 10, 2000 (JP) ........................................ 2000-309225

(51) Int. Cl.$^7$ .............................................. B63K 11/00
(52) U.S. Cl. ...................... 180/205; 180/220; 180/65.1; 180/65.8
(58) Field of Search ................................ 180/220, 205, 180/65.1, 206, 218, 219, 65.2, 65.8, 207; 310/89, 71

(56) References Cited

U.S. PATENT DOCUMENTS

| | | | | |
|---|---|---|---|---|
| 5,474,148 A | * | 12/1995 | Takata | 180/206 |
| 5,505,277 A | * | 4/1996 | Suganuma et al. | 180/206 |
| 5,664,636 A | * | 9/1997 | Ikuma et al. | 180/206 |
| 5,749,429 A | * | 5/1998 | Yamauchi et al. | 180/205 |
| 5,758,736 A | * | 6/1998 | Yamauchi | 180/220 |
| 6,073,717 A | * | 6/2000 | Yamamoto et al. | 180/205 |

FOREIGN PATENT DOCUMENTS

JP A8-175462 * 7/1996

* cited by examiner

*Primary Examiner*—Lesley D. Morris
*Assistant Examiner*—Tony Winner
(74) *Attorney, Agent, or Firm*—Birch, Stewart, Kolasch & Birch, LLP

(57) ABSTRACT

A controller for controlling the rotation of a motor is disposed inside a casing of a power unit for transmitting the rotation of the motor to a driving wheel. An induction-type switch for operating the controller is provided inside the casing of the power unit. A power source converter is provided for driving electrical equipment on the vehicle, and is disposed inside the casing of the power unit. Further, an accelerator opening sensor for detecting the magnitude of an output demand for the motor is provided, and is disposed inside the casing of the power unit. This arrangement concentrates the mass into the power unit, and encloses the high voltage system within the power unit.

24 Claims, 9 Drawing Sheets

ELECTRIC MOTOR-DRIVEN VEHICLE

This nonprovisional application claims priority under 35 U.S.C. §119(a) on patent application Ser. No. 2000-309225 filed in Japan on Oct. 10, 2000, which is herein incorporated by reference.

BACKGROUND OF THE INVENTION

1. Field of the Invention

The present invention relates to an electric motor-driven vehicle, and particularly to an electric motor-driven vehicle in which the structure of a power unit including a controller and a driver is simplified, and concentration of mass is obtained.

2. Description of the Background Art

An electric motor-driven vehicle such as a bicycle using an electric motor as a drive source is provided with a controller and a driver for the electric motor (hereinafter referred to simply as "motor"). Previously, the controller and the like have been disposed separately from the power unit comprising the motor, a motor power transmission and the like. Therefore, assembly and maintenance thereof have been troublesome. As an electric motor-driven vehicle which reduces the disadvantage, there has been proposed a motored bicycle in which the controller is disposed in the space inside the power unit, namely, a crankcase supporting a crankshaft, thereby obtaining concentration of mass (Japanese Patent Laid-open No. Hei 8-175462).

However, having the controller in the power unit as in the case of the power unit described in the publication has yet been insufficient from some viewpoints. First, when a switch for turning ON and OFF the controller is disposed outside the power unit, it is necessary to run a high-voltage cord outside of the power unit. In addition, in the case where the output of the motor is regulated by turning a handle grip, a sensor for detecting the regulation amount is disposed away from the power unit, namely, in the vicinity of the handle, so that it is necessary to run a sensor cord including a high-voltage GND to the inside of the power unit, and concentration of mass is not necessarily sufficient.

SUMMARY OF THE INVENTION

It is therefore an object of the present invention to provide an electric motor-driven vehicle which can solve the above problems, can provide concentration of mass to the power unit and can provide enclosure of the high-voltage system.

In order to attain the above object, the present invention is characterized firstly in that, in an electric motor-driven vehicle using a motor as a drive source, a controller for controlling the rotation of the motor is disposed inside a casing of a power unit for transmitting the rotation of the motor to a driving wheel or wheels, and an induction-type switch for controlling the controller is provided inside the casing of the power unit.

In addition, the present invention is characterized secondly in that an input-output insulation type power source converter for driving electrical equipment mounted on the vehicle is provided inside the casing of the power unit, and is characterized thirdly in that an accelerator opening sensor for detecting an output demand for the motor is provided inside the casing of the power unit.

According to the above characteristic features, the switch for the controller as well as the power source converter and the accelerator opening sensor is provided inside the casing of the power unit, so that it is unnecessary to lead out the high-voltage cord to the outside of the power unit. In addition, since the power source converter and the accelerator opening sensor are provided inside the casing of the power unit, more concentration of mass to the power unit can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
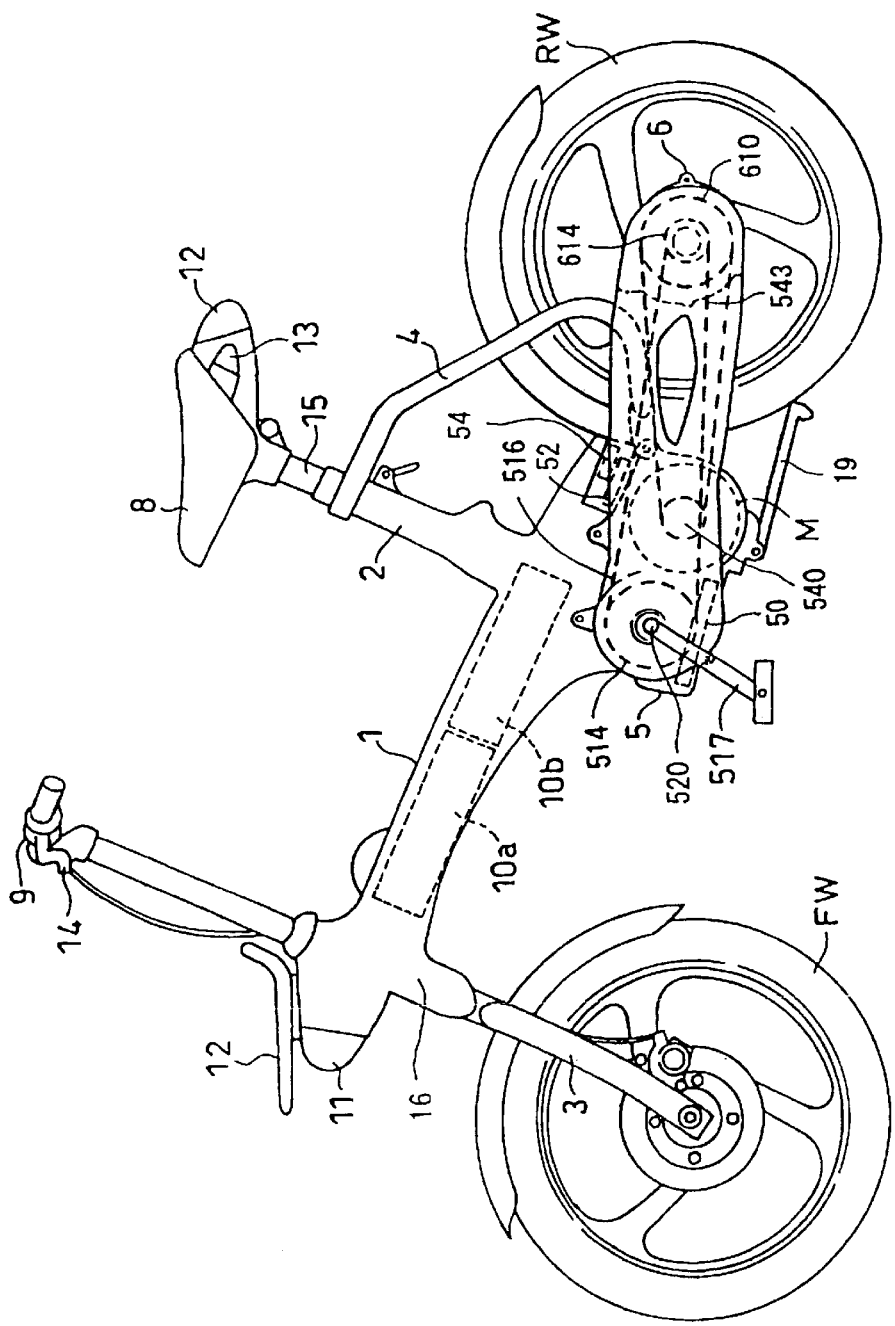
FIG. 1 is a general side view of an electric motor-driven bicycle according to one embodiment of the present invention.

Hereinafter, the present invention will be described in detail below referring to the drawings. FIG. 1 is a side view of an electric motor-driven bicycle according to the present invention, which has an electric running function for running by a driving force of a brushless motor and a human force running function for running by a human force (tread force) inputted from pedals.

A vehicle body front portion and a vehicle body rear portion are connected to each other through a vehicle body frame 1, and a seat post 2 is erected upward at the rear of a central portion of the vehicle body frame 1. A seat pipe 15 is inserted in the seat post 2, and a seat 8 integrally equipped with a tail lamp 12 and left and right signal lights 13 is provided at the top end of the seat pipe 15.

At the tip end of the vehicle body frame 1, a headlight 11 is provided so as to project forward, and a front carrier 12 is fitted on the upper side of the headlight 11. A front fork 3 is shaft-supported on a head pipe 16 at the tip end of the vehicle body frame, and a handle 9 is fitted to the top end of the front fork 3. A front wheel WF is shaft-supported at the lower end of the front fork 3. Brake levers 14 (right one is not shown) for front and rear wheels are provided at the left and right of the handle 9. A right grip (not shown) of the two grips provided at the left and right ends of the handle 9 functions also as an accelerator grip 58 (See FIG. 6).

A power unit 5 is fixed on the lower side of the vehicle body frame 1, and a rear wheel WR is shaft-supported by a transmission unit 6. The power unit 5 incorporates a brushless motor M. A tread force inputted to a crankshaft 520 through a crank 517 or a driving force generated by the brushless motor M is transmitted to the transmission unit 6. The transmission unit 6 is fixed to the vehicle body frame 1 through a U-type frame 4. A control unit 50 is disposed at a front bottom portion in the power unit 5. A spring-up type center stand 19 is provided at a lower portion of the power unit 5.

Figure 2:
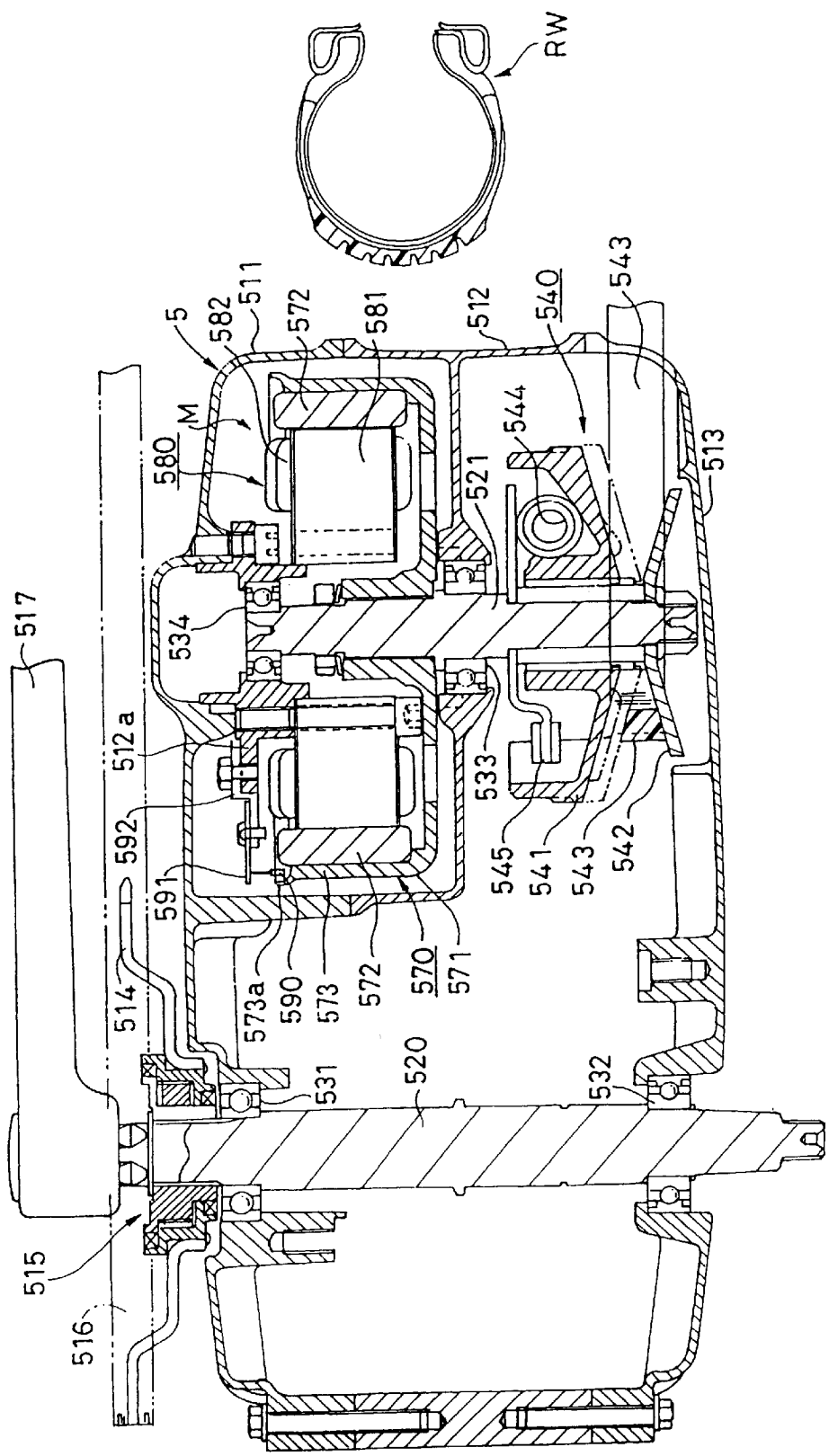
FIG. 2 is a sectional view of a power unit incorporating a brushless motor.

A down converter 52 is disposed on the upper side of the motor M in the power unit 5, and operates as an electrical equipment driving power source converter for adjusting the voltage of a current supplied to general electrical equipment through the control unit 5. A reed switch 54 is also disposed on the upper side of the motor M in the power unit 5, and serves as a main switch FIG. 2 is a sectional view of the power unit 5 taken along a plane orthogonal to the crankshaft 520 and a driving shaft 521, and the same symbols as those in FIG. 1 denote the same or equivalent portions. A casing of the power unit 5 is constituted of a case main body 512 and an L case 513 and an R case 511 which cover the left and right of the case main body 512. The case main body 512 and the L case 513 and the R case 511 covering the left and right of the case main body 512 are preferably formed of a nonferrous metal, for example, aluminum or an aluminum alloy, but may be formed from a resin material high in electrical insulation property.

The crankshaft 520 has its one end shaft-supported by the R case 511 through a bearing 531, and its other end shaft-supported by the L case 513 through a bearing 532. A crank 517 disposed on the outside of the R case 511 is fixed at one end of the crankshaft 520, and a driving sprocket 514 is shaft-supported between the crank 517 and the R case 511 through a one-way clutch 515. The driving sprocket 514 and a driven sprocket 614 (described later) of the transmission unit are connected to each other by a chain 516.

On the other hand, the driving shaft 521 rotated by the motor M is shaft-supported on the case main body 512 through bearings 533, 534. The brushless motor M with the driving shaft 521 as a rotational shaft is provided at one end of the driving shaft 521, and a driving-side pulley 540 is provided at the other end of the driving shaft 521. The driving-side pulley 540 and a driven-side pulley 610 (described later) are connected to each other by a V-belt 543 to constitute an automatic transmission.

The brushless motor M is composed of an inner stator 580 which includes a stator core 581 and an armature coil 582, an outer rotor 570 which includes a bobbin-form flywheel 571 having a ring-form rotor core portion 573 as a major portion and a plurality of driving magnets 572 disposed along an inner peripheral surface of the rotor core portion 573, and a magnetic sensor 590 for detecting the relative position of the outer rotor 570 with reference to the stator 580 based on the magnetic fields of the driving magnets 572. The brushless motor M will be further detailed later referring to FIGS. 4 and 5.

The driving-side pulley 540 is composed of a fixed pulley piece 542 of which movements in rotating directions and in axial directions relative to the driving shaft 521 are fixed, and a movable pulley piece 541 freely slidable in axial direction relative to the driving shaft 521. A holder plate 545 is fitted to the back surface, namely, the surface not in contact with the V-belt 543, of the movable pulley piece 541. The holder plate 545 is restricted in movements in rotating directions and axial directions relative to the driving shaft 521, and is rotated as one body with the driving shaft 521. A vacant space surrounded by the holder plate 545 and the movable pulley piece 541 forms a pocket for containing a roller 544 serving as a governor weight.

Figure 3:
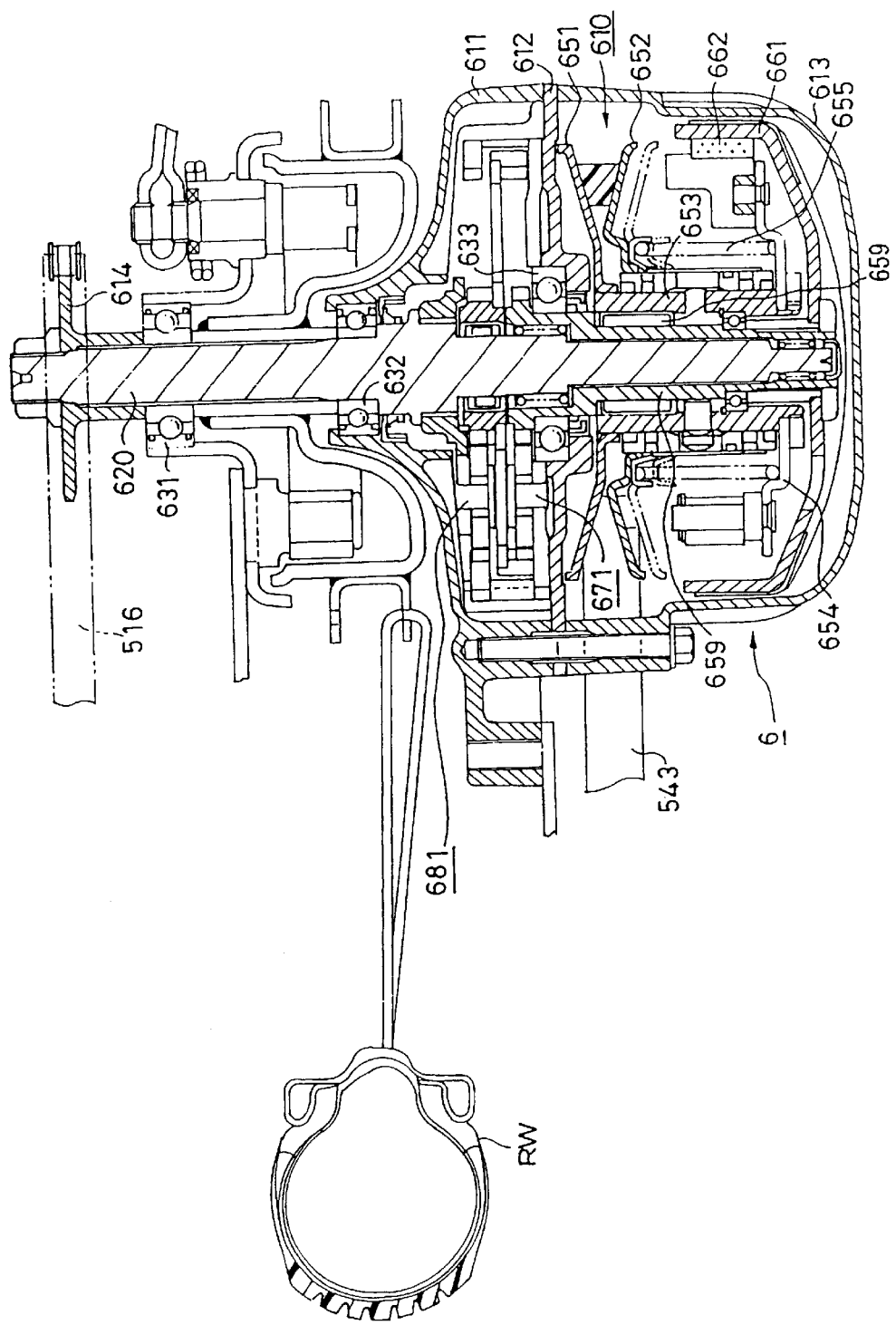
FIG. 3 is a sectional view of a transmission unit.

FIG. 3 is a sectional view of the transmission unit 6 taken along a plane orthogonal to an output shaft 620. A case of the transmission unit 6 is composed of a case main body 612 and an L case 613 and an R case 611 which cover the left and right of the case main body 612. One end of the output shaft 620 is shaft-supported on the R case 611 through a bearing 632. A central portion of the output shaft 620 is shaft-supported on the case main body 512 through a bearing 633.

The driven sprocket 614 connected to the driving sprocket 514 of the power unit 5 by the chain 516 is provided at one end of the output shaft 620. A fixed pulley piece 651 of the driven-side pulley 610 is shaft-supported on the other end of the output shaft 620 through an outer sleeve 653, a needle bearing 658 and an inner sleeve 659. A cup-shaped clutch plate 661 is provided at an end portion of the output shaft 620.

At the outer periphery of the outer sleeve 653, a movable pulley piece 652 is shaft-supported to be slidable relative to the output shaft 620. The movable pulley piece 652 is engaged with a clutch disk 654 so as to be rotatable as one body around the output shaft 620. Between the clutch disk 654 and the movable pulley piece 652, a compression coil spring 655 generating a recoil force in the direction for extending the distance between them is provided.

A driving force transmitted from the V-belt 543 to the movable pulley piece 652 is transmitted through a shoe 662 of the clutch disk 654 to a clutch plate 661, and then transmitted through the inner sleeve 659, first and second planetary gear mechanisms 671, 681 and the output shaft 620 to the rear wheel RW.

Figure 4:
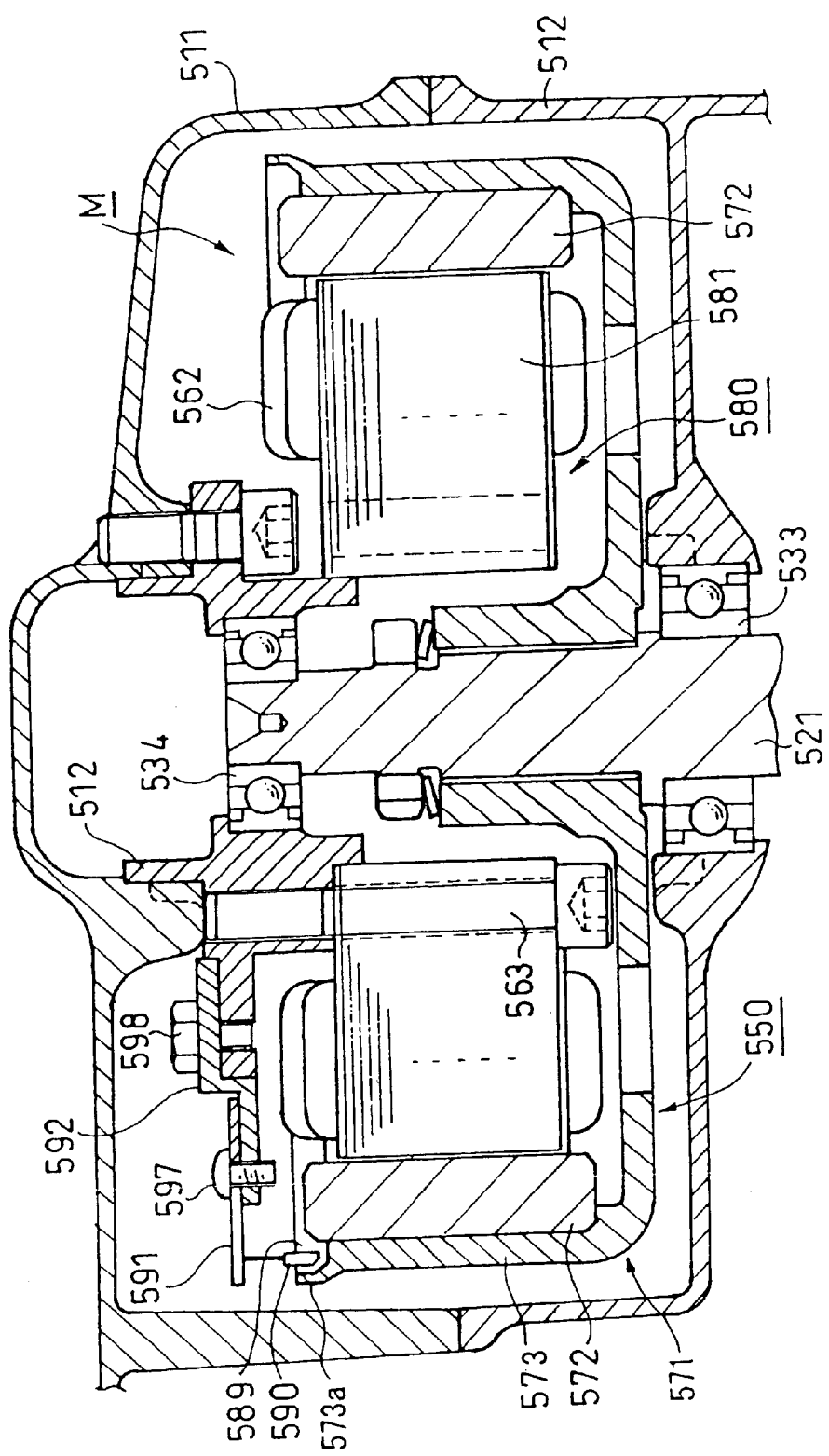
FIG. 4 is a sectional view of the brushless motor within the power unit.
Figure 5:
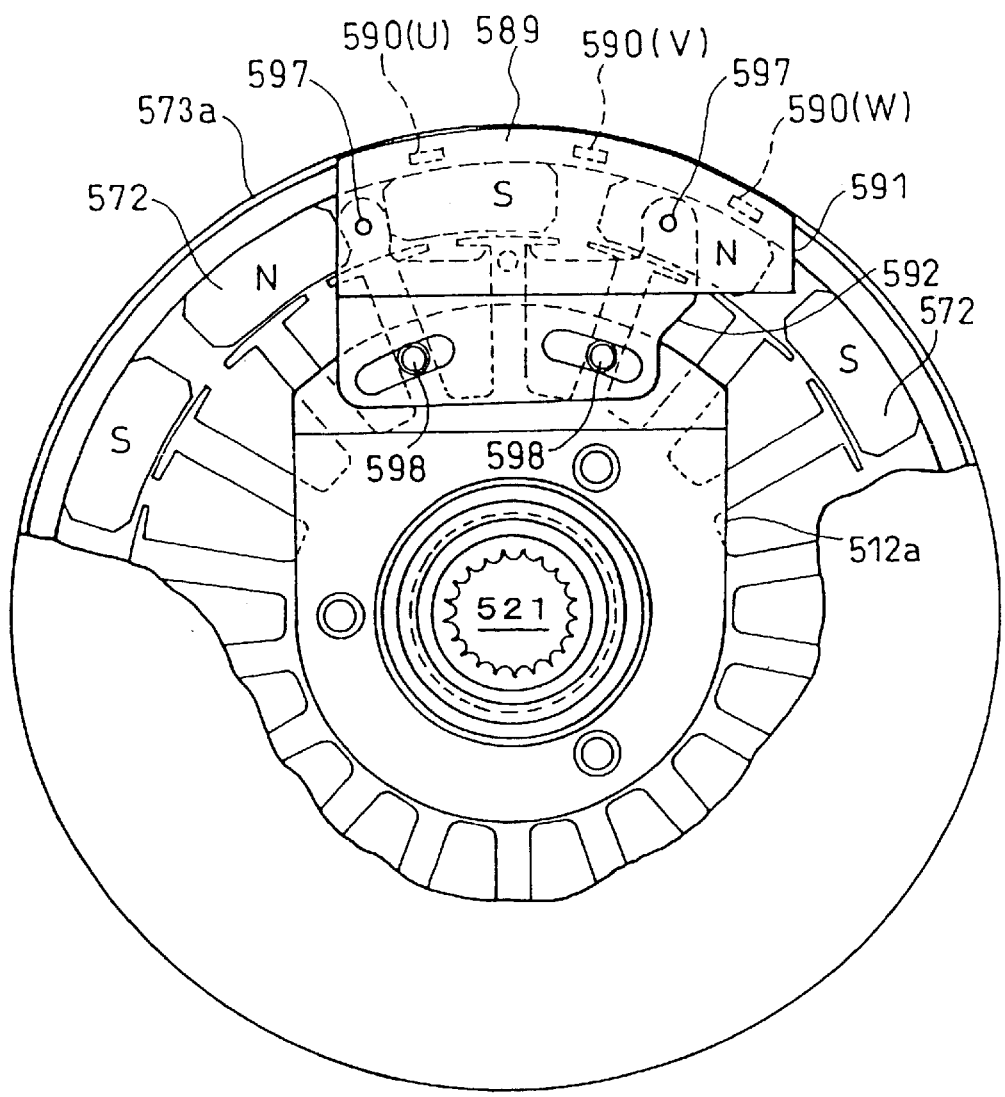
FIG. 5 is a partly broken plan view of the brushless motor.

FIG. 4 is an enlarged sectional view of the brushless motor M in the power unit 5, and FIG. 5 is a partly broken plan view of a major portion of the same. As shown in FIG. 4, the above-mentioned stator core 581 is screwed to the case main body 512 with a screw 563. The flywheel 571 of the outer rotor 570 is fixed to the driving shaft 521. The rotor core portion 573 of the flywheel 571 is provided at its opening portion with a flange portion 573*a* opened to the outside, and the above-mentioned magnetic sensor 590 is erected vertically from a sensor substrate 591 and is positioned on a magnetic path formed in a gap portion between the flange portion 573*a* and the driving magnets 572.

In the present embodiment, at least a portion of the magnetic sensor 590 is so disposed as to be contained in the gap between the flange portion 573*a* and the driving magnets 572. The sensor substrate 591 is screwed to a plate 592 with a screw 597. The plate 592 is screwed to the case main body 512 with a screw 598.

Thus, in the present embodiment, the magnetic sensor 590 is disposed in the gap portion between the flange portion 573*a* opening wider to the outside at the opening end of the rotor core portion 573 and the driving magnets 572. Therefore, while securing a strong magnetic action between the driving magnets 572 and the stator 580, a sufficient magnetic action can be secured also between the magnetic sensor 590 on the outside and the driving magnets 572. Accordingly, while making the driving magnets 572 function also as angle-detecting magnets, the rotating position thereof can be accurately detected by the magnetic sensor 590.

Figure 6:
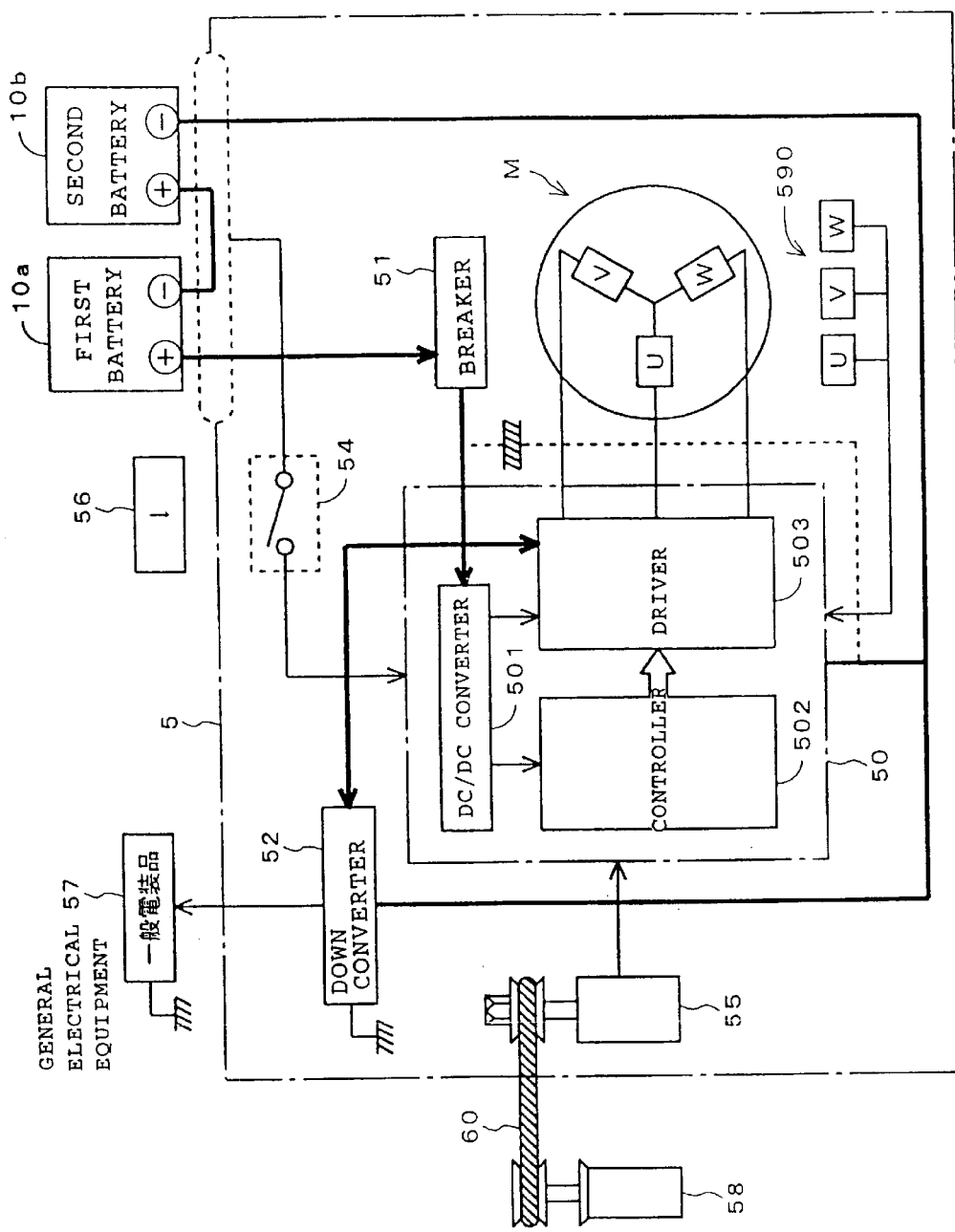
FIG. 6 is a block diagram of a driving circuit for driving the brushless motor.

FIG. 6 is a block diagram showing the constitution of a driving circuit for driving the brushless motor M, and the same symbols as those in FIGS. 1 to 5 denote the same or equivalent portions. The control unit 50 supplies a high-voltage (48 Volt) power source current supplied from a battery 10 (first and second 24 Volt batteries 10a and 10b) through a breaker 51 to each armature coil 582 of the motor M. The down converter 52 lowers the high voltage supplied from the battery 10 to 12V, and supplies the lowered voltage to general electrical equipment 57. The reed switch 54 is adopted as a main switch, and is opened and closed in a non-contact manner by bringing a magnetic key 56 close to the reed switch 54. The magnetic key 56 and the reed switch 54 will be described in more detail later.

An accelerator opening sensor 55 detects the magnitude of an output demand for the motor M, namely, the turning amount of the accelerator grip 58 (accelerator opening). In particular, the rotation of the accelerator grip 58 is transmitted through a wire 60 to a shaft of the accelerator opening sensor 55, and the opening is detected through an output according to the turning amount of the shaft. The accelerator opening sensor 55 and the reed switch 54 are contained in the casing of the power unit 5, and are disposed in proximity to the wall surface of the casing so that they are accessible from the outside of the casing.

The control unit 50 comprises a DC/DC converter 501 for converting the high voltage supplied from the battery 10 into a predetermined DC voltage, a controller 502 and a driver 503. The controller 502 is driven by an output voltage of the DC/DC converter 501, and determines the magnitude and timing of a current supplied to each armature coil 582 of the brushless motor M on the basis of outputs from the accelerator opening sensor 55 and the magnetic sensor 590. The driver 503 is driven by an output voltage of the DC/DC converter 501, and supplies a current to each armature coil 582 of the brushless motor M in response to an instruction from the controller 502. The control unit 50 is contained in a bottom portion of the power unit 5, as has been described.

In the present embodiment, the high voltage (48 V) supplied from the battery 10 is enclosed in the casing in the power unit 5 to be in a floating condition, so that the high voltage would never leak to the outside through the case of the power unit 5.

Figure 7:
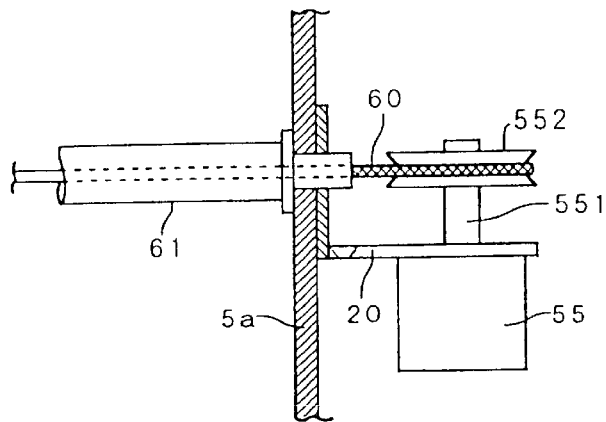
FIG. 7 shows the manner of fitting of an accelerator opening sensor.

FIG. 7 shows the manner of fitting of the accelerator opening sensor 55. In the figure, a bracket 20 is fixed to the inside surface of the casing 5a of the power unit 5, and the accelerator opening sensor 55 is supported on the bracket 20. A pulley 552 is fixed to a turning shaft 551 of the accelerator opening sensor 55, and one end of the wire 60 is fixed to the outer periphery of the pulley 552. The wire 60 is led out to the outside through a hole formed in the casing 5a, and is guided in a conduit tube 61 to be connected at its one end to the grip 58 of the handle 9.

Figure 8:
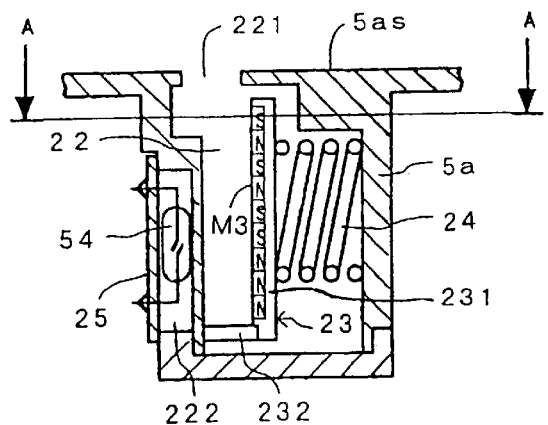
FIG. 8 is a side sectional view showing a key-slot construction including a reed switch.
Figure 9:
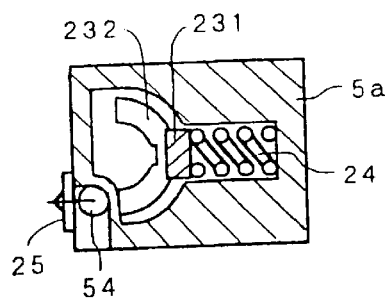
FIG. 9 is a plan sectional view showing the key-slot construction including the reed switch.
Figure 10:
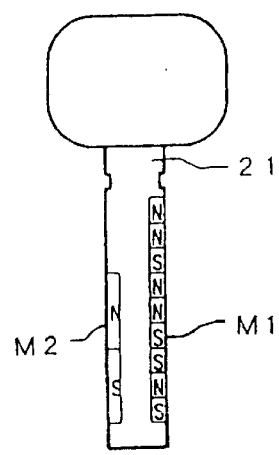
FIG. 10 is a side view showing the magnetized state of a key.

FIG. 8 is a side sectional view showing a key construction including the reed switch 54, FIG. 9 is a sectional view taken along line A—A of FIG. 8, and FIG. 10 is a side view showing a magnetized state of a key. In FIG. 10, the key 21 is provided with two magnetized bands, one of which is a magnetized band M1 for key number verification, and the other is a magnetized band M2 for operating the reed switch 54.

In FIGS. 8 and 9, the casing 5a is provided with a key slot 22 into which the key 21 is inserted. A movable body 23 disposed orthogonal to a top surface 5 as of the casing 5a is provided beneath an opening 221 of the key slot 22. The movable body 23 comprises a magnet portion 231 having a magnetized band M3 which makes a pair with the magnetized band M1 of the appropriate key, and a key restraint portion 232 connected to the lower end of the magnet portion 231. The movable body 23 is biased by a spring 24 from the back side. The wall surface of the key slot 22 is provided with a recessed portion 222 on the side of the inside of the casing 5a, and a base plate 25 is provided so as to close the recessed portion 222. The reed switch 54 is fixed to the base plate 25 so as to make contact with a bottom surface of the recessed portion 222.

Figure 11A:
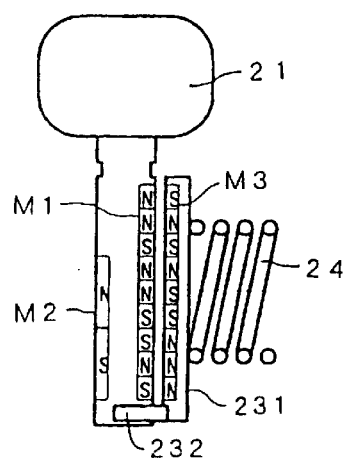
FIGS. 11A and 11B show the action of the key-slot where the key is inappropriate.
Figure 11B:
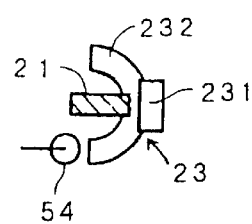

Operation with the key will be described referring to FIGS. 11 and 12. First, when the key is inappropriate, as shown in FIG. 11A, the repelling force between the magnetized band M1 of the key 21 inserted into the key slot 22 and the magnetized band M2 of the movable body 23 is weak, so that the movable body 23 is not displaced to the side of the spring 24. Therefore, the key 21 cannot be rotated because it is restrained by the key restraint portion 232 as shown in FIG. 11A. When the key 21 cannot be rotated, the magnetized band M2 of the key 21 cannot get close to the reed switch 54, so that the reed switch 54 is not closed. Namely, the main switch is not closed.

Figure 12A:
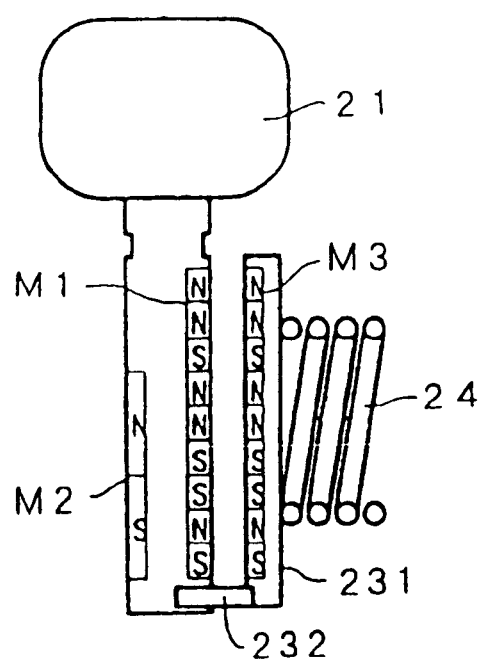
FIGS. 12A and 12B show the action of the key-slot where the key is appropriate.
Figure 12B:
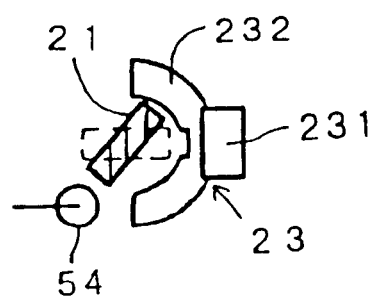

On the other hand, when the key is appropriate, as shown in FIG. 12A, a sufficient repelling force is generated between the magnetized band M1 of the key 21 inserted into the key slot 22 and the magnetized band M2 of the movable body 23, whereby the movable body 23 is displaced to the side of the spring 24. As a result, restraint of the key 21 by the key restraint portion 232 is cleared, and the key 21 is permitted to rotate. Here, as shown in FIG. 12B, the key 21 is rotated to bring the magnetized band M2 of the key 21 into proximity to the reed switch 54, whereby the reed switch 54 is closed, namely, the main switch is closed.

According to the invention, the high voltage system can be enclosed in the power unit. In addition, since the power source converter and the accelerator opening sensor are provided inside the casing of the power unit, more concentration of mass to the power unit can be achieved.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric motor-driven vehicle using a motor as a drive source, wherein
   a controller for controlling the rotation of said motor is disposed inside a casing of a power unit for transmitting the rotation of said motor to a driving wheel or wheels, and
   an induction switch for biasing said controller is provided, and said switch is disposed inside said casing of said power unit,
   wherein said induction switch is closed when a corresponding key external to said casing is in proximity to said induction switch.

2. The electric motor-driven vehicle as set forth in claim 1, wherein an input-output insulation power source converter is provided for driving electrical equipment mounted on said vehicle, and said power source converter is disposed inside said casing of said power unit.

3. The electric motor-driven vehicle as set forth in claim 1, wherein an accelerator opening sensor for detecting an output demand for said motor is provided, and said accelerator opening sensor is disposed inside said casing of said power unit.

4. The electric motor-driven vehicle as set forth in claim 1, wherein said induction switch include:
   a switch housing; and
   an opening in said switch housing for receiving a key therein.

5. A vehicle, comprising:
a frame;
a plurality of wheels supporting said frame;
a power unit supported by said frame, said power unit including:
   a casing;
   an electric motor located within said casing for driving at least one of said wheels;
   a controller located within said casing for controlling rotation of said motor; and
   an induction switch located within said casing for switching said controller on and off,
wherein said induction switch includes:
   a switch housing; and
   an opening in said switch housing for receiving a key therein.

6. The vehicle as set forth in claim 5, wherein the induction switch further includes a movable key-restraining body disposed within said switch housing.

7. The vehicle as set forth in claim 6, further comprising a spring for biasing said key-restraining body in a predetermined direction.

8. The vehicle as set forth in claim 6, wherein said key-restraining body includes a magnet portion and a key restraint portion.

9. The vehicle as set forth in claim 8, wherein said magnet portion is an elongated member.

10. The vehicle as set forth in claim 8, wherein said key restraint portion is located at a lower end of said magnet portion.

11. The vehicle as set forth in claim 8, wherein said key restraint portion includes a groove for receiving a portion of a key therein which obstructs rotation of the key.

12. The vehicle as set forth in claim 5, further comprising a reed switch disposed within said switch housing.

13. The vehicle as set forth in claim 5, further comprising an accelerator opening sensor located within said casing for detecting an output demand for said motor.

14. The vehicle as set forth in claim 5, further comprising at least one battery supported by said frame for powering said electric motor.

15. The vehicle as set forth in claim 5, further comprising a pair of foot pedals for driving said at least one of said wheels.

16. A vehicle, comprising:
a frame;
a plurality of wheels supporting said frame;
a power unit supported by said frame, said power unit including:
   a casing;
   an electric motor located within said casing for driving at least one of said wheels;
   a controller located within said casing for controlling rotation of said motor;
   an induction switch located within said casing for switching said controller on and off; and
   an accelerator opening sensor located within said casing for detecting an output demand for said motor; and
at least one battery supported by said frame for powering said electric motor,
wherein said induction switch is closed when a corresponding key external to said casing is in proximity to said induction switch.

17. A vehicle, comprising:
a frame;
a plurality of wheels supporting said frame;
a power unit supported by said frame, said power unit including:
   a casing;
   an electric motor located within said casing for driving at least one of said wheels;
   a controller located within said casing for controlling rotation of said motor;
   an induction switch located within said casing for switching said controller on and off; and
   an accelerator opening sensor located within said casing for detecting an output demand for said motor; and
at least one battery supported by said frame for powering said electric motor,
wherein said induction switch includes:
   a switch housing;
   an opening in said switch housing for receiving a key therein; and
   a movable key-restraining body disposed within said switch housing.

18. The vehicle as set forth in claim 17, wherein said movable key-restraining body includes:
   an elongated magnet portion; and
   a key restraint portion located at a lower end of said magnet portion, said key restraint portion including a groove for receiving a portion of the key therein which obstructs rotation of the key.

19. The vehicle as set forth in claim 18, further comprising:
   a reed switch disposed within said switch housing; and
   a spring located within said switch housing for biasing said key-restraining body in a direction toward said reed switch.

20. The vehicle as set forth in claim 19, further comprising a pair of foot pedals for driving said at least one of said wheels.

21. A vehicle, comprising:
a frame,
a plurality of wheels supporting said frame;
a power unit supported by said frame, said power unit including:
   a casing;
   an electric motor located within said casing for driving at least one of said wheels;
   a controller located within said casing for controlling rotation of said motor; and
   an induction switch located within said casing for switching said controller on and off,
wherein said induction switch is closed when a corresponding key external to said casing is in proximity to said induction switch.

22. The vehicle as set forth in claim 21, further comprising an accelerator opening sensor located within said casing for detecting an output demand for said motor.

23. The vehicle as set forth in claim 21, further comprising at least one battery supported by said frame for powering said electric motor.

24. The vehicle as set forth in claim 21, further comprising a pair of foot pedals for driving said at least one of said wheels.

* * * * *